United States Patent [19]
Hierons

[11] Patent Number: 5,439,092
[45] Date of Patent: Aug. 8, 1995

[54] CONVEYING ROD LIKE ARTICLES

[75] Inventor: Kerry Hierons, High Wycombe, England

[73] Assignee: Molins PLC, Milton Keynes, England

[21] Appl. No.: 246,697

[22] Filed: May 20, 1994

[30] Foreign Application Priority Data

May 22, 1993 [GB] United Kingdom ............... 9310606

[51] Int. Cl.⁶ ..................................... B65B 1/00
[52] U.S. Cl. ......................... 198/347.3; 198/347.2
[58] Field of Search ............... 198/347.1, 347.2, 347.3

[56] References Cited

U.S. PATENT DOCUMENTS

| | | | |
|---|---|---|---|
| 4,280,611 | 7/1981 | Molins et al. | 198/347.3 |
| 4,339,026 | 7/1982 | Base et al. | 198/347.3 |
| 4,344,520 | 8/1982 | Czoch et al. | 198/347.3 |
| 4,349,096 | 9/1982 | Thamerus | 198/347.3 |
| 4,373,624 | 2/1983 | Molins et al. | 198/347.3 |
| 4,872,543 | 10/1989 | Hinchcliffe | 198/347.3 |

FOREIGN PATENT DOCUMENTS

| | | | |
|---|---|---|---|
| 2135951 | 9/1984 | United Kingdom | 198/347.1 |
| 2257954 | 1/1993 | United Kingdom | 198/347.2 |

Primary Examiner—James R. Bidwell
Attorney, Agent, or Firm—Antonelli, Terry, Stout & Kraus

[57] ABSTRACT

The state of fill of a reversible cigarette reservoir is monitored by use of an encoder (40) which responds to movement of the reservoir conveyor (2). Signals from the encoder are processed by a microprocessor (44) which also receives signals from cigarette detectors (46,50) which indicate when the reservoir is full or empty. These signals are used to reset the encoder-based value of the state of fill and so help to avoid cumulative errors. The use of encoder-based signals allows users to set the value of fill at which related events occur (e.g. when the speed of an associated maker or packer is changed) using software. Also disclosed is a conveyor speed optimization system in which the average deviation of a level sensor (74) from a target value is monitored and if necessary a correction applied to the nominal conveyor speed so as to reduce the average deviation to zero.

13 Claims, 2 Drawing Sheets

CONVEYING ROD LIKE ARTICLES

This invention relates to conveying rod-like articles, particularly articles of the tobacco industry such as cigarettes or filter rods.

In the manufacture of articles of the tobacco industry it is common to transport the articles directly from a delivery device such as a producing machine to a receiving device such as a packing machine, with the articles being conveyed on endless band conveyors in the form of a continuous multi-layer stream of articles moving in a direction transverse to the lengths of the articles. Typically such streams are 90–100 mm in height. It is known to provide a buffer reservoir for accommodating temporary or longer term differences in the rates of operation of the delivery and receiving devices, such reservoirs often taking the form of conveyor means supporting a variable length multi-layer stream of articles which is moved towards or away from a junction with a similar stream passing directly from the delivery device to the receiving device. The present invention is particularly, but not exclusively, concerned with conveyor systems incorporating a reservoir of this kind.

According to a first aspect of the invention a conveyor system for rod-like articles includes a variable capacity reservoir for articles comprising a reversible conveyor for supporting a variable length stream of articles in multi-layer stack formation and for conveying said stream to or from a junction, means movable with the conveyor for generating a signal indicative of direction and distance of movement of the conveyor, means for counting signals generated by said signal generating means, first sensor means for generating a full signal, preferably when a leading part of said stream on said conveyor reaches a predetermined position, second sensor means for generating an empty signal, preferably when a leading part of said stream reaches another predetermined position, and means for processing signals from said means for generating signals and from said first and second sensor means so as to generate an indication of the capacity of the reservoir. Preferably said processing means performs a calculation based on distance travelled by the conveyor, said calculation being corrected whenever an appropriate signal is received from said first or second sensor means. The means for generating signals may comprise encoder means associated with a wheel or pulley around which the conveyor passes. The processing means, which may incorporate a microprocessor, may be arranged to accept signals from the generating means only to the extent that they indicate the capacity of the reservoir within a predetermined range (e.g. 0.1% to 99.9%). Thus, the processing means may be arranged to give an indication that the reservoir is full (100%) or empty (0%) only when the leading end of the stream on the conveyor reaches the respective predetermined positions adjacent said first or second sensor means, with the counting means being automatically reset whenever signals are received from either of said sensor means. In this way cumulative or other errors which can occur in a system based simply on count of signals generated by movement of the conveyor are corrected on occurrence of each full or empty condition of the reservoir.

According to another aspect of the invention a conveyor system for rod-like articles includes a variable capacity reservoir for articles comprising a reversible conveyor for supporting a variable length stream of articles in multi-layer stack formation and for conveying said stream to or from a junction, means movable with the conveyor for generating a signal indicative of direction and distance of movement of the conveyor, means for counting signals generated by said signal generating means, and processor means including means for receiving signals from said counting means and for providing output signals according to said signals, wherein said processing means is provided with input means whereby the value of the count at which said output signals are generated may be varied. In a preferred arrangement, wherein the conveyor system includes a delivery device and a receiving device, the output signals may be transmitted to one or both of said devices in such a manner that the speed of operation of said device or devices is varied on attainment of a predetermined count value corresponding to a predetermined state of fill of the reservoir.

According to a further aspect of the invention a conveyor system for rod-like articles includes at least one conveyor for conveying a multi-layer stream of rod-like articles in stack formation in a direction transverse to the lengths of the articles, means for determining a nominal speed for said conveyor, sensor means for measuring a level or quantity of cigarettes on the conveyor or in the vicinity of a junction with the conveyor, means responsive to signals from said sensor means for varying the speed of said conveyor around said nominal speed according to deviation of a measured value of the level or quantity of cigarettes from a nominal or target value of said level or quantity, wherein said determining means includes means for adjusting said nominal speed when said measured value exhibits a net average deviation from said mean or target value, so as to vary said nominal speed in such direction that the average value of said level or quantity more closely corresponds with said nominal or target value. Preferably the determining means includes processor means capable of repeated operations to vary the nominal speed in small increments according to the results of a comparison of said measured value with said nominal or target value.

The invention will be further described, by way of example only, with reference to the accompanying diagrammatic drawings, in which.

Figure 1:
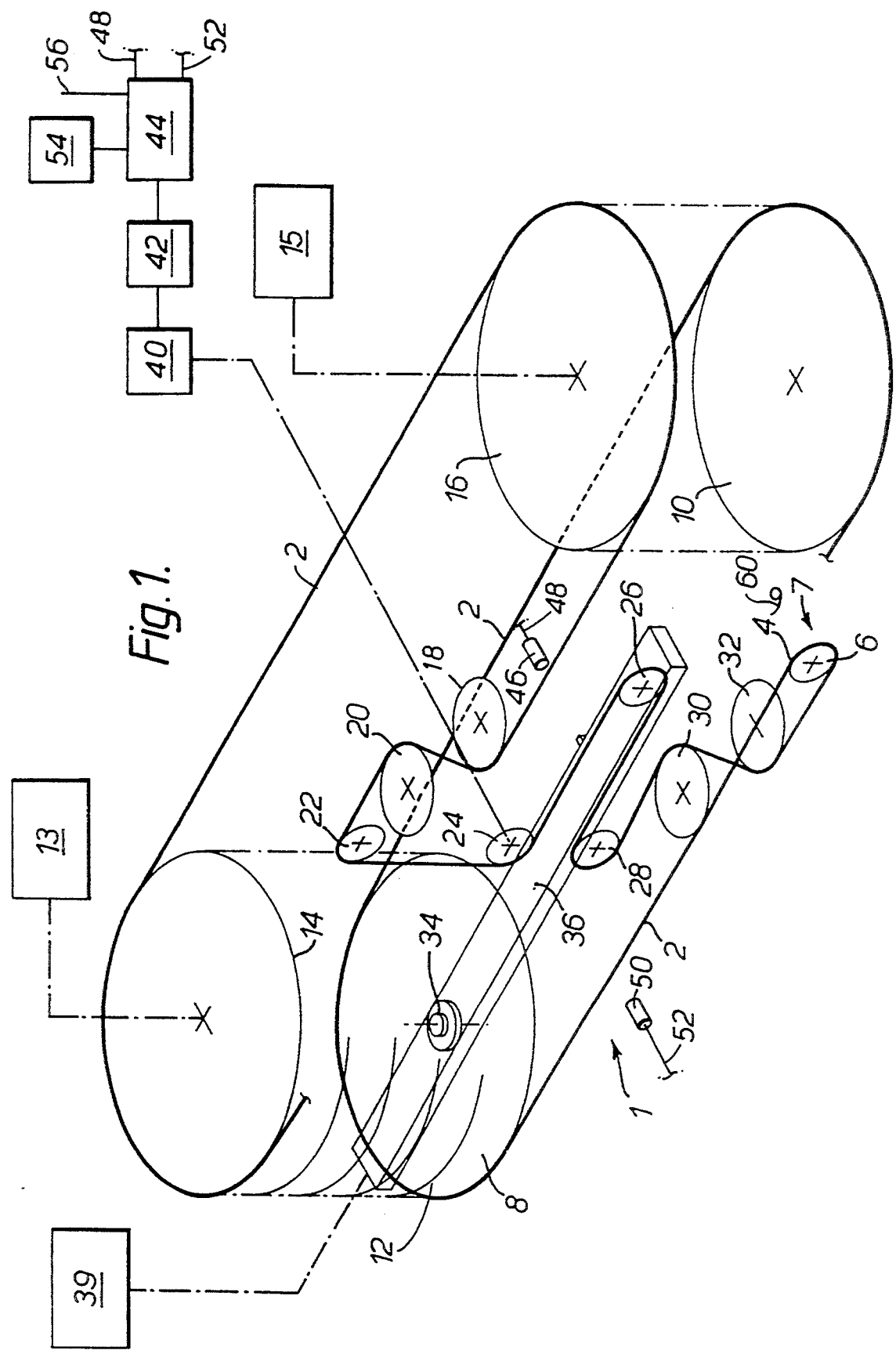
FIG. 1 is a perspective schematic view of a reservoir for cigarettes.

FIG. 1 shows a reservoir 1 including an endless support conveyor 2 for a multi-layer stream of cigarettes (not shown). The run of conveyor 2 which supports the cigarette stream extends from a position 4 at the top of a first pulley 6, rotatable about a horizontal axis, around a first wheel 8, rotatable about a vertical axis, to a second, spaced wheel 10. The support run of the conveyor 2 extends around the wheel 10 to a further wheel 12, located above the first wheel 8, and then to a further wheel above the wheel 1 0, and generally continues in this manner following an elongated helix up to an upper pair of wheels 14,16, respectively located above the wheels 8 and 10. Typically there may be four or six vertically-spaced wheels at each end of the reservoir. The conveyor 2 has a return run extending from the upper wheel 16 around a number of pulleys 18-32 and hence back to the pulley 6.

The pulley 6 is located adjacent a junction 7, e.g. a T-junction in a mass flow conveyor system extending between a cigarette making machine and a cigarette packing machine, so that a continuous multi-layer stream of cigarettes may be received on the conveyor 2 and be progressively conveyed into the reservoir 1 by movement of the conveyor 2. The leading end of the stream may be bounded by an end wall (not shown) carried by the conveyor 2. When the leading end of the stream reaches the region of upper wheel 16 the reservoir is full. The conveyor 2 is reversible so that a stream may be delivered to the junction 7 from the reservoir 1. The construction and arrangement of the reservoir 1 so far described is substantially similar to the applicants' OSCAR reservoir and as described in U.S. Pat. No. 4,339,025, to which reference is directed for further details. By way of further explanation, the conveyor 2 is supported on and driven by the wheels and is supported between the wheels by guides which are not shown in FIG. 1.

The form of the conveyor 2 may be substantially as disclosed in said U.S. Pat. No. 4,339,025 but could in principle comprise any laterally flexible conveyor capable of supporting a multi-layer stream of cigarettes. One suitable form of conveyor comprises a link conveyor with each link carrying a slat providing a support surface for cigarettes, the links being interconnected so as to allow relative movement about an axis perpendicular to as well as an axis parallel to the support surface: a conveyor of this type is available from SKF Handling Systems of S-415 50 Goteborg, Sweden under the designation Flex-Link.

The wheels 10 and 16 and the wheels between them rotate about a common fixed vertical axis and are connected to a motor 15 for common rotation of the wheels. Similarly the wheels 12 and 14 and the wheels between them rotate about a common fixed vertical axis and are connected to a motor 13. The motors 13 and 15 are electronically synchronised so that they provide a common drive for the conveyor 2. The wheel 8 is rotatable about a vertical spindle 34 which is carried by a rigid beam 36. The beam 36 is movable in a direction parallel to its length on slide mountings (not shown). Drive means (indicated at 39) is provided for moving and positioning the beam 36: suitable forms of drive means are a rack and pinion, timing belt or recirculating ball.

Movement of the beam 36 to move the wheel 8 and thereby increase or decrease the capacity of the reservoir 1 can significantly reduce acceleration requirements on the main part of the conveyor 2 passing through the body of the reservoir by effectively providing a small buffer reservoir in series with the main reservoir. The construction and operation of the parts associated with the beam 36 and the consequent bodily movement of the wheel 8 form no part of the present invention and will not be further described. For further details reference is directed to the Assignees' U.S. application Ser. No. 010,395, filed 28 Jan. 1993, now U.S. Pat. No. 5,361,888, the disclosure of which is hereby incorporated herein in its entirety.

An encoder 40 is linked to the idler pulley 24 around which the conveyor 2 passes in part of its return run. The encoder 40 is connected to a counter 42 and each pulse has a two phase output separated by 90° so that the counter is capable of counting +1 for each pulse received when the pulley 24 rotates by an incremental amount (e.g. one tenth of a revolution) in a first direction (e.g. corresponding to reservoir filling) and is capable of counting −1 when the pulley rotates by an incremental amount in the opposite direction (e.g. corresponding to reservoir emptying). The output from counter 42 is processed in a microprocessor 44. Alternatively, the microprocessor 44 may perform the operation of counting the pulses from the encoder 40, in which case the unit 42 comprises an input device providing a suitable interface between the encoder and the microprocessor.

An optical sensor 46 is provided adjacent the upper run of the conveyor 2 between the uppermost wheel 16 and the first idler pulley 18 in the return run of the conveyor. The sensor 46 detects presence of cigarettes in the bottom row of a stack on the conveyor 2 adjacent the sensor. When the leading edge of the stack reaches this position (during filling) the reservoir is deemed to be full. The signal from the sensor 46 is transmitted by way of a line 48 incorporating a suitable interface device (not shown) to the microprocessor 44.

Another optical sensor 50 is provided adjacent the run of conveyor 2 between the pulley 6 adjacent the junction 7 and the lowermost wheel 8. The sensor 50 detects presence of cigarettes in the bottom row of the stack on the conveyor 2 adjacent the sensor. When the leading end of the stack reaches this position (during emptying) the reservoir 1 is deemed to be empty. The signal from the sensor 50 is transmitted by way of a line 52 incorporating a suitable interface device (not shown) to the microprocessor 44.

Information is provided to the microprocessor 44 on the number of encoder signals which correspond with distance travelled by the conveyor 2 between positions adjacent the sensors 46 and 50. Hence, assuming the microprocessor 44 is signalled when the reservoir is initially filled by movement of a stack from the junction 7 (e.g. by manually or automatically resetting the counter 42 when the leading end of the stack first passes the sensor 50), the count provided by the encoder 40 will normally allow the microprocessor to provide a continuous indication of the state of fill of the reservoir 1. This indication can be transmitted to an output device 54, which may for example include a display monitor. The state of fill of the reservoir 1 could be displayed as a percentage of the maximum capacity of the reservoir.

It will be apparent that certain errors could affect the accuracy of any indication of the state of fill of the reservoir I which relies on encoder signals. The most likely cause of error is where cigarettes have fallen or been removed from the conveyor 2. Other possible but less likely sources of error are slippage of the conveyor 2 on the pulley 24, temporary overloading of the microprocessor 44 resulting in encoder signals being missed, or electrical noise causing false count signals.

Protection is afforded against cumulative errors by arranging for the reservoir volume value generated in the microprocessor 44 from the encoder signals to be reset to 100% whenever the sensor 46 detects the leading end of the stack and for the output to be reset to 0% when the sensor 50 detects an absence of cigarettes. In addition, count signals derived from the encoder are only allowed to alter the reservoir volume value within the range 0.1% to 99.9%. As a result, most of the potential fault conditions referred to above will be automatically corrected at the next reservoir full or empty condition, without any requirement for operator intervention. However, when articles have been removed or fallen from the conveyor 2 other than at the leading end of the stack, i.e. to leave a gap in the stack on the conveyor, the maximum reservoir capacity will be reduced by the quantity of cigarettes in the gap since the reservoir 1 will be perceived as full and stopped from further filling when the leading end of the stack reaches the sensor 46. Thus, although the reservoir 1 is not truly full no further movement of the conveyor 2 in the filling direction is possible or desirable. On the other hand, when the reservoir 1 is emptying the sensor 50 will detect the gap (and reset the capacity to 0%) before the reservoir is empty. In this case it is desirable that the conveyor 2 should be able to continue to move in the emptying direction until the leading end of the stack reaches the sensor 50. Most occurrences of this latter condition can be corrected by providing a second sensor, similar in function to the sensor 50 but spaced along the length of the conveyor 2 from it by a distance exceeding the likely length of any gap (e.g. 500 mm), so that a reservoir empty condition is signalled only when both sensors detect a lack of cigarettes. The two spaced sensors may comprise the sensor 50 and a conventional spoon-type sensor 60 at the junction 7. A low level at the junction 7 (as sensed by the spoon-type sensor 60), which would normally indicate presence of a gap or at least a depression in the cigarette stream coming from the reservoir 2, could be used to cause the conveyor 2 to move in the unloading direction so as to remove the gap.

The reservoir volume value derived from the count signals may be used to control operation of the system of which the reservoir 1 forms part. Thus, where the system includes a cigarette making machine and a cigarette packing machine the microprocessor 44 may be provided with one or more output lines 56 which (by way of suitable output interfaces) provide signals for controlling the operation of the making and/or packing machines and/or associated conveyors of the system. For example, the microprocessor 44 may be arranged so that when the reservoir volume is greater than or equal to 100% the making machine is disabled and when the value is less than or equal to 0% the packing machine is disabled. The respective restart values for the making and packing machines could be 95% and 5%. Similarly, the reservoir volume value could be used to initiate a speed reduction of the making machine, e.g. the making machine could be run at a reduced speed when the volume exceeds 60% and returned to normal (full) speed when the value reduces below 40%. Where the packing machine can be run at high, normal or low speeds the high speed may be selected at a reservoir volume value of 70% and deselected at 55%, and the low speed may be selected at a value of 30% and deselected at 45%.

An important advantage of providing the reservoir volume value from an encoder count processed by the microprocessor 44 is that all of the volume values referred to above at which the various events occur may be easily adjusted and can be readily redefined by the user by use of simple input commands to the microprocessor by way of a suitable input device (e.g. a keyboard). By way of contrast, prior art systems in which such events were controlled by volumes of fill of a reservoir similar to the reservoir 1 were typically controlled by sensors positioned along the length of the conveyor passing through the reservoir: any changes required in the volume values at which any event occurred therefore required physical movement of one or more sensors, which could be difficult and in any event would be likely to be more troublesome than a simple command made to the microprocessor.

Figure 2:
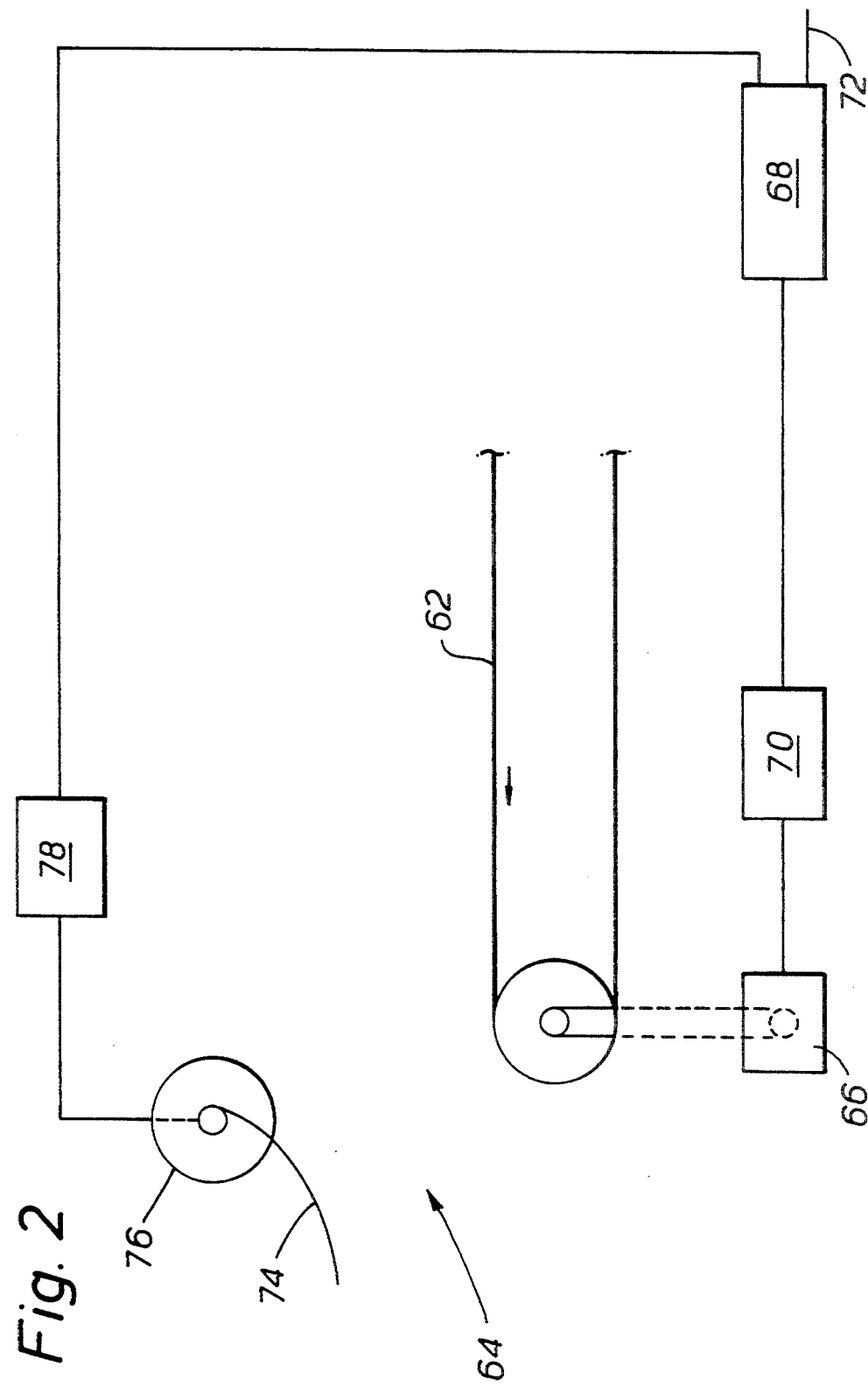
FIG. 2 is a side view of part of a conveyor system for cigarettes.

FIG. 2 shows part of a conveyor system including an endless band conveyor 62 for conveying a multi-layer stream of cigarettes (not shown) towards a junction 64. Beyond the junction 64 the stream may be conveyed by a further conveyor (not shown) which conveyor could comprise another endless band conveyor or a chute leading to a receiving device. The conveyor 62 is driven by a motor 66 under control of a microprocessor 68 by way of a suitable interface device 70. The microprocessor 68 includes an input line 72 on which a speed signal from another device or conveyor of the system is received. Typically the signal on input 72 is measured directly from a linked machine (e.g. a cigarette making machine), or passed from an upstream conveyor which is in series with the conveyor 62. Where necessary, the signal is processed within the microprocessor 68 to generate a value in suitable units, e.g. cigarettes per minute (cpm).

In the region of the junction 64 is a pivoting spoon sensor 74 which is connected to a resolver rotary transducer 76 coupled directly to a resolver to digital converter 78. The signal derived from the converter 78 relates to angular position of the spoon relative to a predefined calibration position. This signal is processed by the microprocessor 68 to produce a linear stack height signal, substantially as described in U.S. Pat. No. 4,830,176, to which reference is directed for further details. The microprocessor 68 performs a processing operation on the height signal so as to produce an error rate (E) signal according to the equation $$E = H(A) - H(T) \times E(K)$$

where
H(A) is the actual measured height,
H(T) is the target or nominal height, and
E(K) is the error gain constant (typically 200 cpm/mm).

The microprocessor 68 generates a signal for the speed (M) of the motor 66 according to the following algorithm $$M = (I + E) \times (1/G) \times (100/S)$$

where I is the input rate (derived from the signal on line 72),
E is the error rate (derived from the signal from sensor 74 as calculated above),
G is the gear reduction constant (necessary to convert the speed in cpm to motor speed), and
S is a user alterable stack density scaling term.

The scaling term S is set to represent the average density of cigarettes in a typical 90 mm stack, expressed as a percentage of the theoretical maximum (i.e. corresponding to a perfect honeycomb) for cigarettes of a nominal diameter (e.g. 7.5 mm). The following table gives the value of S together with the theoretical maximum density for cigarettes of 7.5, 8.0 and 8.5 mm diameter, together with the corresponding number (N) of cigarettes in a 90 mm × 1000 mm stack.

| Diameter | Theoretical Density | N | S | N |
| --- | --- | --- | --- | --- |
| 7.5 | 100% | 1843 | 80.0 | 1475 |
| 8.0 | 88.1% | 1625 | 70.5 | 1300 |
| 8.5 | 77.9% | 1437 | 62.3 | 1150 |

In the above table the average density, as compared with the theoretical maximum for any given diameter, is taken to be 80%. This figure, or other conditions in the system, may vary with the result that the average height of the cigarette stack at the junction 64 may be greater or less than the target or nominal value. In order to correct this the system may be refined to incorporate a feedback term which will alter the stack density value so as to maintain the actual height at the junction close to the target height. Thus, in effect the feedback can be regarded as introducing a modification of the nominal speed of the conveyor 62. The microprocessor 68 is arranged to perform the following operations while the conveyor 62 is running:

1. Calculate an average height (H(A)) over a given period (e.g. 10 seconds)
2. Calculate H(A)−H(T)
3. If the result of step 2 is positive, decrease S by 0.1% (which induces a conveyor speed increase), and go to step 1
4. If the result of step 2 is negative (or 0), increase S by 0.1% (which induces a conveyor speed decrease), and go to step 1.

Repeated performance of these operations will cause the conveyor 62 to run at such speed that the height of the cigarette stack at the junction 64 will be maintained close to the target level.

Although the junction 64 and the sensor 74 are typically located at the downstream end of conveyor 62, i.e. the sensor 74 controls an upstream conveyor, the use of the present system in an arrangement in which a conveyor is controlled by a upstream sensor is not excluded. The conveyor 2 in the FIG. 1 embodiment could be controlled in the same way as the conveyor 62 in the system of FIG. 2, e.g. with the sensor 60 performing the function of the sensor 74. In that case the operations performed in the microprocessors 44 and 68 could be performed in a common microprocessor.

I claim:

1. A conveyor system for rod-like articles including a variable capacity reservoir for articles comprising a reversible conveyor for supporting a variable length stream of articles in multi-layer stack formation and for conveying said stream to or from a junction, means movable with the conveyor for generating a signal indicative of direction and distance of movement of the conveyor, means for counting signals generated by said signal generating means, first sensor means responding directly to the stream of articles for generating a full signal when a leading part of said stream on said conveyor reaches a predetermined position, second sensor means responding directly to the stream of articles for generating an empty signal when a leading part of said stream reaches another predetermined position, and means for processing signals from said counting means and from said first and second sensor means so as to generate an indication of the capacity of the reservoir, wherein said processing means comprises means for performing a calculation of the capacity of the reservoir based on distance travelled by the conveyor, and means for correcting said calculation whenever an appropriate signal is received from said first or second sensor means, whereby the indication of the capacity of the reservoir generated by said processing means is corrected, where necessary, whenever said full or empty signal is received.

2. A conveyor system according to claim 1, further comprising display means for displaying said indication of the capacity of the reservoir as generated by said processing means.

3. A conveyor system according to claim 1, including pulley means around which the conveyor passes, wherein the means for generating signals comprises encoder means associated with said pulley means.

4. A conveyor system according to claim 1, wherein the processing means includes means for accepting signals from the generating means only to the extent that they indicate the capacity of the reservoir within a predetermined range.

5. A conveyor system according to claim 4, wherein the processing means includes means arranged to give an indication that the reservoir is full when the leading end of the stream on the conveyor reaches a respective predetermined position adjacent said first sensor means.

6. A conveyor system according to claim 4, wherein the processing means includes means arranged to give an indication that the reservoir is empty when the leading end of the stream on the conveyor reaches a respective predetermined position adjacent said second sensor means.

7. A conveyor system for rod-like articles including a variable capacity reservoir for articles comprising a reversible conveyor for supporting a variable length stream of articles in multi-layer stack formation and for conveying said stream to or from a junction, means movable with the conveyor for generating a signal indicative of direction and distance of movement of the conveyor, means for counting signals generated by said signal generating means, first sensor means for generating a full signal, preferably when a leading part of said stream on said conveyor reaches a predetermined position, second sensor means for generating an empty signal preferably when a leading part of said stream reaches another predetermined position, and means for processing signals from said means for generating signals and from said first and second sensor means so as to generate an indication of the capacity of the reservoir, wherein the processing means includes means arranged to give an indication that the reservoir is empty when the leading end of the stream on the conveyor reaches a respective predetermined position adjacent said second sensor means, and wherein said second sensor means comprises at least two sensors spaced along the conveying direction of said conveyor.

8. A conveyor system according to claim 1, wherein said correcting means includes means for resetting the counting means in response to signals from either of said first and second sensor means.

9. A conveyor system for rod-like articles including a variable capacity reservoir for articles comprising a delivery device and a receiving device, a reversible conveyor for supporting a variable length stream of articles in multi-layer stack formation and for conveying said stream to or from a junction, means movable with the conveyor for generating a signal indicative of direction and distance of movement of the conveyor, means for counting signals generated by said signal generating means, processor means including means for receiving signals from said counting means and for providing output signals according to said signals, and means for transmitting said output signals to at least one of said devices in such manner that the speed of operation of the device is varied on attainment of a predetermined value corresponding to a predetermined state of fill of the reservoir.

10. A conveyor system for rod-like articles including at least one conveyor for conveying a multi-layer stream of rod-like articles in stack formation in a direction transverse to the lengths of the articles, means for determining a nominal speed for said conveyor, sensor means for measuring a level or quantity of cigarettes on the conveyor or vicinity of a junction with the conveyor, means responsive to signals from said sensor means for varying the speed of said conveyor around said nominal speed according to deviation of a measured value of the level or quantity of cigarettes from a nominal or target value of said level or quantity, wherein said determining means includes means for adjusting said nominal speed when said measured value exhibits a net average deviation from said mean or target value, so as to vary said nominal speed in such direction that the average value of said level or quantity more closely corresponds with said nominal or target value.

11. A conveyor system according to claim 10, wherein the determining means includes processor means capable of repeated operations to vary the nominal speed in small increments according to the results of a comparison of said measured value with said nominal or target value.

12. A conveyor system for rod-like articles including a variable capacity reservoir for articles comprising a delivery device and a receiving device, a reversible conveyor for supporting a variable length stream of articles in multi-layer stack formation and for conveying said stream to or from a junction, means movable with the conveyor for generating a pulse train signal indicative of direction and distance of movement of the conveyor, a first sensor disposed along said conveyor within said reservoir for generating a full signal when a leading part of said stream on said conveyor reaches said first sensor, a second sensor disposed along said conveyor within said reservoir for generating an empty signal when a leading part of said stream reaches said second sensor, and a microprocessor responsive to said pulse train signal and said full and empty signals for generating a continuous indication of the current capacity of the reservoir.

13. A conveyor system according to claim 12, wherein said microprocessor comprises means for performing a calculation of the capacity of the reservoir based on the distance travelled by the conveyor, and means for correcting said calculation whenever a full or an empty signal is received from said first and second sensors.

* * * * *